US008532021B2

(12) United States Patent
Tumminaro

(10) Patent No.: US 8,532,021 B2
(45) Date of Patent: Sep. 10, 2013

(54) DATA COMMUNICATIONS OVER VOICE CHANNEL WITH MOBILE CONSUMER COMMUNICATIONS DEVICES

(75) Inventor: John Tumminaro, Palo Alto, CA (US)

(73) Assignee: Obopay, Inc., San Mateo, CA (US)

( * ) Notice: Subject to any disclaimer, the term of this patent is extended or adjusted under 35 U.S.C. 154(b) by 437 days.

(21) Appl. No.: 11/694,903

(22) Filed: Mar. 30, 2007

(65) Prior Publication Data

US 2007/0230371 A1    Oct. 4, 2007

Related U.S. Application Data

(60) Provisional application No. 60/744,013, filed on Mar. 30, 2006, provisional application No. 60/744,930, filed on Apr. 15, 2006.

(51) Int. Cl.
  *H04W 4/00* (2009.01)
(52) U.S. Cl.
  USPC .......... 370/328; 455/12.1; 455/466; 455/563; 370/389
(58) Field of Classification Search
  USPC ................ 370/389, 328, 310; 455/12.1, 466, 455/563
  See application file for complete search history.

(56) References Cited

U.S. PATENT DOCUMENTS

| | | | |
|---|---|---|---|
| 3,829,706 A | 8/1974 | Seip | |
| 5,155,860 A | 10/1992 | McClure | |
| 5,249,218 A | 9/1993 | Sainton | |
| 5,257,414 A | 10/1993 | Trahan et al. | |
| 5,348,485 A | 9/1994 | Briechle et al. | |
| 5,428,666 A | 6/1995 | Fyfe et al. | |
| 5,541,985 A | 7/1996 | Ishii et al. | |
| 5,557,516 A | 9/1996 | Hogan | |
| 5,586,166 A | 12/1996 | Turban | |
| 5,815,426 A | 9/1998 | Jigour et al. | |
| 6,012,634 A | 1/2000 | Brogan et al. | |
| 6,029,144 A | 2/2000 | Barrett et al. | |
| 6,175,922 B1 | 1/2001 | Wang | |
| 6,213,390 B1 | 4/2001 | Oneda | |
| 6,438,528 B1 | 8/2002 | Jensen et al. | |
| 6,601,761 B1 | 8/2003 | Katis | |

(Continued)

FOREIGN PATENT DOCUMENTS

| | | |
|---|---|---|
| AU | 5991994 | 2/1995 |
| AU | 1264395 | 8/1995 |

(Continued)

OTHER PUBLICATIONS

Trefor Moss; Show Me the Money; Mobile Communications International, London; Nov. 2001; Iss 84; p. 1; Http://proquest.umi.com/pqdweb?did=813964561&sid=4&Fmt=2&clientId=19649&RQT=309&VName=PQD.

(Continued)

*Primary Examiner* — Kamran Afshar
*Assistant Examiner* — Shahriar Behnamian
(74) *Attorney, Agent, or Firm* — James E. Eakin

(57) ABSTRACT

Mobile consumer communications devices can communicate their program application data over the voice channel of a wireless communications network. Structured by a protocol suitable for the voice channel, the data are encoded into tones which are transmitted over the voice channel. A server receives the tones over the voice channel, which are decoded into program application data structured by the protocol, and passed to an enterprise application. The server can respond accordingly over the voice channel.

3 Claims, 1 Drawing Sheet

(56) References Cited

U.S. PATENT DOCUMENTS

| | | |
|---|---|---|
| 6,611,913 B1 | 8/2003 | Carroll et al. |
| 6,711,262 B1 | 3/2004 | Vatanen |
| 6,736,322 B2 | 5/2004 | Gobburu et al. |
| 6,747,547 B2 | 6/2004 | Benson |
| 7,044,362 B2 | 5/2006 | Yu |
| 7,089,208 B1 | 8/2006 | Levchin et al. |
| 7,119,659 B2 | 10/2006 | Bonalle et al. |
| 7,181,017 B1 | 2/2007 | Nagel et al. |
| 7,191,151 B1 | 3/2007 | Nosek |
| 7,216,144 B1 | 5/2007 | Morris et al. |
| 7,231,372 B1 | 6/2007 | Prange et al. |
| 7,249,094 B2 | 7/2007 | Levchin et al. |
| 7,249,256 B2 | 7/2007 | Hansen et al. |
| 7,353,393 B2 | 4/2008 | Hansen et al. |
| 7,364,068 B1 | 4/2008 | Strubbe et al. |
| 7,392,388 B2 | 6/2008 | Keech |
| 7,475,043 B2 | 1/2009 | Light et al. |
| 7,613,919 B2 | 11/2009 | Bagley |
| 7,653,200 B2 | 1/2010 | Karmi et al. |
| 7,720,760 B1 | 5/2010 | Cook et al. |
| 7,909,246 B2 | 3/2011 | Hogg et al. |
| 2002/0025795 A1 | 2/2002 | Sharon et al. |
| 2002/0152179 A1 | 10/2002 | Racov |
| 2002/0178098 A1 | 11/2002 | Beard |
| 2002/0186845 A1 | 12/2002 | Dutta et al. |
| 2002/0194072 A1 | 12/2002 | Blink et al. |
| 2002/0194099 A1 | 12/2002 | Weiss |
| 2003/0003895 A1 | 1/2003 | Wallentin et al. |
| 2003/0005329 A1 | 1/2003 | Ikonen |
| 2003/0019881 A1 | 1/2003 | Kim |
| 2003/0078793 A1 | 4/2003 | Toth |
| 2003/0126094 A1 | 7/2003 | Fisher et al. |
| 2003/0187754 A1 | 10/2003 | Dixson, Jr. |
| 2003/0194071 A1 | 10/2003 | Ramian |
| 2003/0220884 A1 | 11/2003 | Choi et al. |
| 2004/0030601 A1 | 2/2004 | Pond et al. |
| 2004/0054592 A1 | 3/2004 | Hernblad |
| 2004/0093281 A1 | 5/2004 | Silverstein et al. |
| 2004/0107108 A1* | 6/2004 | Rohwer .................. 704/275 |
| 2004/0111367 A1 | 6/2004 | Gallagher et al. |
| 2004/0143552 A1 | 7/2004 | Weichert et al. |
| 2004/0210518 A1 | 10/2004 | Tiem |
| 2004/0215507 A1 | 10/2004 | Levitt et al. |
| 2004/0215526 A1 | 10/2004 | Luo et al. |
| 2004/0267665 A1 | 12/2004 | Nam et al. |
| 2005/0033684 A1 | 2/2005 | Benedyk et al. |
| 2005/0043996 A1 | 2/2005 | Silver |
| 2005/0044038 A1 | 2/2005 | Whiting et al. |
| 2005/0044040 A1 | 2/2005 | Hiward |
| 2005/0044042 A1 | 2/2005 | Mendiola et al. |
| 2005/0065851 A1 | 3/2005 | Aronoff et al. |
| 2005/0147057 A1* | 7/2005 | LaDue .................. 370/310 |
| 2005/0182724 A1 | 8/2005 | Willard |
| 2005/0187873 A1 | 8/2005 | Labrou et al. |
| 2005/0195975 A1 | 9/2005 | Kawakita |
| 2005/0199709 A1 | 9/2005 | Linlor |
| 2005/0240526 A1 | 10/2005 | Hill |
| 2005/0246293 A1 | 11/2005 | Ong |
| 2005/0278222 A1 | 12/2005 | Nortrup |
| 2006/0000900 A1 | 1/2006 | Fernandes et al. |
| 2006/0004655 A1 | 1/2006 | Alexander et al. |
| 2006/0015402 A1 | 1/2006 | Graves et al. |
| 2006/0085302 A1 | 4/2006 | Weiss et al. |
| 2006/0106738 A1 | 5/2006 | Schleicher |
| 2006/0143087 A1 | 6/2006 | Tripp et al. |
| 2006/0149665 A1 | 7/2006 | Weksler |
| 2006/0156385 A1 | 7/2006 | Chiviendacz et al. |
| 2006/0200427 A1 | 9/2006 | Morrison et al. |
| 2006/0224470 A1 | 10/2006 | Garcia Ruano et al. |
| 2006/0224508 A1 | 10/2006 | Fietz |
| 2006/0235758 A1 | 10/2006 | Schleicher |
| 2006/0265493 A1 | 11/2006 | Brindley et al. |
| 2006/0283935 A1 | 12/2006 | Henry et al. |
| 2006/0294025 A1 | 12/2006 | Mengerink |
| 2007/0005490 A1 | 1/2007 | Gopalakrishnan |
| 2007/0050303 A1 | 3/2007 | Schroeder et al. |
| 2007/0053511 A1 | 3/2007 | Maggenti |
| 2007/0055635 A1 | 3/2007 | Kanapur et al. |
| 2007/0106564 A1 | 5/2007 | Matotek et al. |
| 2007/0125838 A1 | 6/2007 | Law et al. |
| 2007/0175978 A1 | 8/2007 | Stambaugh |
| 2007/0288373 A1 | 12/2007 | Wilkes |
| 2008/0010194 A1 | 1/2008 | Thomas |
| 2008/0046359 A1 | 2/2008 | Allin et al. |
| 2008/0046362 A1 | 2/2008 | Easterly |
| 2008/0046988 A1 | 2/2008 | Baharis et al. |
| 2008/0098464 A1 | 4/2008 | Mizrah |
| 2008/0212771 A1 | 9/2008 | Hauser |
| 2008/0298589 A1 | 12/2008 | Katar et al. |
| 2009/0119190 A1 | 5/2009 | Realini |
| 2009/0132347 A1 | 5/2009 | Anderson et al. |
| 2009/0150283 A2 | 6/2009 | Bent et al. |
| 2010/0094732 A1 | 4/2010 | Smith |

FOREIGN PATENT DOCUMENTS

| | | |
|---|---|---|
| AU | 4534497 | 2/1998 |
| BR | 9408529 | 8/1997 |
| CN | 1145676 | 3/1997 |
| EP | 666549 | 8/1995 |
| EP | 1107198 | 6/2001 |
| EP | 1109138 | 6/2001 |
| EP | 1109138 | 8/2002 |
| EP | 1528518 | 5/2005 |
| GB | 2372615 | 8/2002 |
| HU | 9602116 | 9/1996 |
| IL | 112375 | 9/1995 |
| KR | 1996-705885 | 11/1996 |
| KR | 1996-705887 | 11/1996 |
| KR | 1996-706384 | 12/1996 |
| KR | 1996-706653 | 12/1996 |
| KR | 1996-706694 | 12/1996 |
| KR | 1996-706727 | 12/1996 |
| KR | 1996-706744 | 12/1996 |
| KR | 1997-700336 | 1/1997 |
| KR | 1997-700737 | 2/1997 |
| KR | 1997-700891 | 2/1997 |
| KR | 2001-25740 | 4/2001 |
| KR | 2001-91827 | 10/2001 |
| KR | 2002-83570 | 4/2002 |
| NZ | 277428 | 2/1998 |
| PL | 316012 | 12/1996 |
| RU | 2180761 | 3/2002 |
| SG | 464411 | 2/1998 |
| WO | WO95-21427 | 10/1995 |
| WO | WO 97/45814 | 4/1997 |
| WO | WO97045814 | 12/1997 |
| WO | WO 02/059847 | 1/2002 |
| WO | WO02059847 | 2/2002 |
| WO | WO02059847 | 8/2002 |
| WO | 2007024148 | 3/2007 |
| WO | WO2007024148 | 3/2007 |
| ZA | 9500214 | 5/1996 |

OTHER PUBLICATIONS

Emilie E. Valcourt et al: "Investigating Mobile Payment: Supporting Technologies, Methods, and Use"; Wireless and Mobile Computing, Networking and Communications, 2005. (W IMOB '2005), IEEE International Conference on Montreal, Canada, Aug. 22-24, 2005, Piscataway, NJ, USA IEEE, vol. 4, Aug. 22, 2005, pp. 29-36, XP010839727.

Valcourt et al.; Investigating Mobile Payment Supporting Technologies, Methods, and Use; Wireless and Mobile Computing, Networking and Communications, 2005 (W IMOB '2005); IEEE International Conference on Montreal, Canada, Aug. 22-24, 2005, Piscataway, NJ, USA, IEEE, vol. 4, Aug. 22, 2005, pp. 29-36, XP010839727.

* cited by examiner

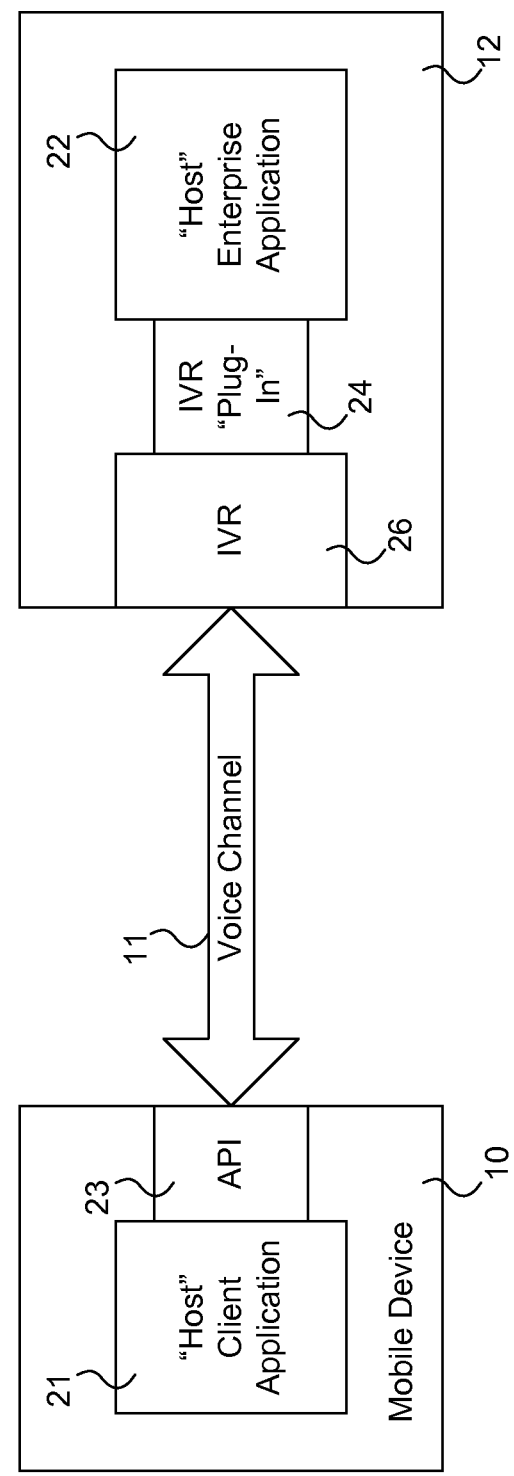

DATA COMMUNICATIONS OVER VOICE CHANNEL WITH MOBILE CONSUMER COMMUNICATIONS DEVICES

CROSS-REFERENCE TO RELATED APPLICATIONS

This patent application claims priority to U.S. Provisional Patent Application Nos. 60/744,013, filed Mar. 30, 2006 and 60/744,930, filed Apr. 15, 2006, which are incorporated by reference along with all other references cited in this application.

BACKGROUND OF THE INVENTION

This invention generally relates to mobile consumer communications devices and, particularly to, program applications which run on the mobile consumer communications device and communicate over the voice channel of the device.

The convenience of wireless communications has made cellular telephones ubiquitous. To take advantage of the popularity of cellular telephones, other mobile electronic devices, such as personal digital assistants (PDAs) and the like, have incorporated wireless communications capabilities so as to blur the definitions of these devices. As described herein, all such devices are referred to as mobile consumer communications devices to avoid confusion. When a particular type of mobile consumer communications devices is intended, then the specific term is used, e.g., cellular telephone, PDA, etc.

In any case, the convenience and functionality of mobile consumer communications devices have encouraged these devices to run more and more program applications. These applications are either standalone applications which are self-contained and do not communicate externally, or networked applications which require communication to other remote applications in order to work properly. Examples of standalone applications include single player games, such as Solitaire, and examples of networked applications include e-mail applications and multi-player games. Networked applications in one device can communicate to applications in other devices (peer communications) or may communicate to a central "server" application (client/server communications).

Mobile consumer communications devices use a variety of modes in data communication channels for networked applications. Among these modes are: IP/HTTP which allows the mobile device to access any Internet-based service, just as any desktop PC can; SMS which allows the mobile device to send/receive short text messages to/from peer human users, as well as to/from enterprise applications; MMS which allows the mobile device to send/receive multi-media messages, such as pictures, video and audio to/from peer human users, as well as to/from enterprise applications; and so forth. However, these data communication modes are distinct from the voice communications mode (i.e., the telephone), the voice channel over which consumers use to talk to others. In fact, the companies which provide the wireless communications, such as Cingular, T-Mobile, Verizon, etc., charge for the data communication services in addition to the cellular telephone services.

The present invention provides for a way for users to run networked applications on mobile consumer communications devices over the voice channel of the device. This not only allows users the benefits of networked application on mobile consumer communications devices with only voice service, but also gives mobile consumer communications devices with access to a data communications channel another pathway for networked applications.

BRIEF DESCRIPTION OF THE DRAWINGS

FIG. 1 is a block diagram representation of the voice channel communication between a mobile consumer communications device and a network server, according to one embodiment of the present invention.

DETAILED DESCRIPTION OF EMBODIMENTS OF THE INVENTION

Mobile consumer communications devices, such as cellular telephones, ordinarily use a voice channel to transmit and receive voices. The present invention provides a way for program applications to communicate their data over the voice channel of mobile consumer communications devices.

The present invention permits applications which may be created on any number of programming platforms/runtimes for mobile applications to be networked by the voice channel of the host mobile consumer communications device. Example platforms include BREW (Binary Runtime Environment for Wireless) developed by Qualcomm, Inc. of San Diego, Calif. to provide a standard set of application-programming interfaces for developers to easily add new features and applications to Qualcomm-based wireless hardware, i.e., handsets equipped with CDMA chipsets; J2ME (Java 2 Mobile Edition), a Java-based technology for mobile systems from Sun Microsystems, Inc. of Santa Clara, Calif.; .NET from Microsoft, Inc. of Redmond, Wash. to provide a software development platform for the Windows operating system and uses XML (eXtended Markup Language); Symbian, a platform designed for mobile devices from a joint venture of many companies, including L.M. Ericsson of Stockholm Sweden, and Nokia Corp. of Espoo, Finland. Of course, other programming, platforms/runtimes may be used.

FIG. 1 illustrates an arrangement by which data is transmitted over a voice channel of a wireless communications network, according to one embodiment of the present invention. An example mobile consumer communications device 10, e.g., a cellular telephone, PDA and the like, communicates over a voice channel 11 of the wireless communications network. Ordinarily these communications are conversations. An API (Application Program Interface) 23 allows the data from a mobile application, i.e., the host client application 21, implemented in a platform/runtime described above to communicate over the voice channel 11 to a server system 12. The API 23 encodes the data in tones for transmission over the voice channel 11. In this example, the long-standing DTMF (Dual Tone Multi-Frequency) is used, but other encoding suitable for the voice channel can be used.

With DTMF tones being received, the server 12 across the wireless communications network engages IVR (Interactive Voice Response) unit 26 to decode the tones. IVR can send and receive DTMF tones (sometimes called "touch tones") and is found in many current automatic telephone answering systems. It allows a computer to automatically interact with a human using Voice Recognition, Audio Playback, Text-To-Speech (TTS) and DTMF technologies. An IVR "Plug-in" 24 is an IVR-adapted API to place the data into a proper form for an application 22 in the server 12. This allows the application 21 hosted in the mobile consumer communications device 10 to communicate with the enterprise application 22 hosted in the server 12 over the voice channel 11. Data signals travel in both directions between the two applications 21 and 22. Communications simply between the mobile consumer communications device 10 and the server 12 are examples of client/server communications over the voice channel. On the other hand, the operation of the server application 22 might be to simply relay the data from the mobile consumer communications device 10 to another mobile consumer communications device. This is an example of peer communications over the voice channel.

The API in an embodiment of the present invention, e.g., the APIs 23 and 24 of FIG. 1, is based upon a simple "sendRequest( )"/processRequest( )" model with well-known request/response data structures on both the client and server sides. The APIs 23 and 24 are a paired set of client and server APIs which mobile application and enterprise server developers use to build a complete client/server application. Voice data processing software (i.e. library components) on both the client (mobile consumer communications device) and server sides implement voice data processing algorithms for data communication across the voice channel. These algorithms are, of course, distinct from the particular client/server applications 21 and 23.

An example of an API is as follows:
SendRequest( ) Client Function:
This is the single API interface that a mobile client application uses in order to send a request/data to an enterprise server application.
Input: A Request structure
Output: A Response structure
ProcessRequest( ) Server Function:
This is the single API interface that the enterprise server application implements in order to process a calling mobile client's request. The processing logic is completely the responsibility of the "host" enterprise application and it is also the responsibility of the host enterprise application to assemble the response data that will be returned to the calling mobile client.
Input: A Request structure
Output: A Response structure
Request Structure:
CommandID—A numeric value which uniquely represents a command (and associated parameter data) that is understood by both the host client and server applications.
ServerAddress—A numeric value which represents a "phone number" that will be used in order to "dial" a voice call which will reach the server IVR component which "front ends" the target enterprise service.
ParameterData—An array of ParameterData that is associated to "this" CommandID request.
Response Structure:
ResponseID—A numeric value which uniquely represents a response (and associated parameter data) that is understood by both the host client and server applications.
ParameterData—An array of ParameterData that is associated to "this" ResponseID result.
ParameterData Structure:
ParameterID—A numeric value which uniquely represents a parameter within a given CommandID and is understood by both the host client and server applications.
ParameterType—A numeric value with the following settings:
1—numeric
2—alpha
. . . other types
ParameterValue—The actual value of the parameter
Encoding/Decoding
As mentioned above, an API can use different encoding/decoding algorithms, according to the present invention. The following is one example for encoding with DTMF. These rules of DTMF encoding are based on commonly accepted rules of entering numbers and letters using the keypad labeling found on telephones:

A. All data elements are ultimately encoded as a number.
B. Each complete data element ends with a '#' code.
C. Number data elements use their associated DTMF numbers.
D. Number data elements are sent as unbroken sequence.
E. Each complete number data element sequence ends with a '#' code.
F. Alpha data elements are broken up into individual character elements.
G. Individual alpha character elements are encoded using the following scheme:
'A'=2
'B'=22
'C'=222
'D'=3
'E'=33
'F'=333
. . . and so on using standard DTMF alpha encoding rules.
H. Individual alpha character elements end with '#' code.
I. Each complete alpha data element ends with a '#' code.
J. Each complete request/response structure ends with a '#' code.

The encoding example above shows numeric and upper case alphabetic characters specifically. However, encoding for lower case and special characters can be made as well.

Hence the elements of the API described above provide a protocol by which data from program applications can communicate over the voice channel of mobile consumer communications devices.

Examples of Voice Channel Data Applications

One example of an application is simple text messaging through the voice channel, rather than through a data channel as done conventionally. The application 21 hosted by the mobile consumer communications device 10 of FIG. 1, for instance, sends alphanumeric signals with an identification of the recipient, e.g., a telephone number, across the voice channel 11. The enterprise application 22 in the server 12 simply relays the alphanumeric signals to the designated recipient across another voice channel. Of course, it is assumed that the recipient also has the described capabilities of receiving and sending data across a voice channel.

A more complex example of a networked application which more fully utilizes the particular API features described above is a mobile payment functionality for mobile consumers. All required client/server data communications are performed via a voice channel "phone call." In this application example, the mobile consumers are assumed to have mobile consumer communications devices which are capable of running a mobile payment application and the consumer's mobile service plan allows voice calls only. A "source" consumer wants to send money from his or her mobile account to a friend's ("target" consumer) mobile account. Both the source and target consumers are "signed up" for the service that the enterprise server application provides. The enterprise server application provides a web service API which transfers funds from a source account to a target account.

The commands in this example are payRequest, represented by CommandID 1, and payResponse, represented as CommandID 2. The parameter data structures are defined in the two tables below:

TABLE 1 payRequest Parameter Data Definition:

| Parameter Name | Parameter Description | Data Type | ParameterID |
| --- | --- | --- | --- |
| sourceAccountNumber | Account number of the consumer that is sending the money | 1 - numeric | 1 |
| sourcePIN | Authentication data of the consumer sending the money | 1 - numeric | 2 |
| payAmount | Amount of money the source consumer wants to send to the target consumer | 1 - numeric | 3 |
| targetAccountNumber | Account number of the consumer that the money is being sent to | 1 - numeric | 4 |
| payMessage | A message that the source consumer wants to attach to this transaction (i.e. a memo) | 2 - alpha | 5 |

TABLE 2 payResponse Parameter Data Definition:

| Parameter Name | Parameter Description | Data Type | ParameterID |
| --- | --- | --- | --- |
| status | Status of the transaction. 0 means success, 1 means failure. | 1 - numeric | 6 |
| transactionNumber | Unique transaction number associated to this request | 1 - numeric | 7 |

Now for the source consumer to pay a target consumer, the following operations and interactions occur:

1. The host mobile client application interacts with the source consumer and gathers the following data:
   a. sourceAccountNumber—'123456789'
   b. sourcePIN—'4321'
   c. payAmount—'15'
   d. sourceAccountNumber—'987654321'
   e. payMessage—'THANKS'
2. The host mobile client application "knows" the following data as a result of context and configuration:
   a. commandID—'1' (i.e. payRequest)
   b. serverAddress—'8885551212' (i.e. the "phone number" of the enterprise application's IVR component)
3. The host mobile application assembles the following data structures:
   a. ParameterData[1]
      i. ParameterID=1
      ii. ParameterType=1
      iii. ParameterValue='123456789'
   b. ParameterData[2]
      i. ParameterID=2
      ii. ParameterType=1
      iii. ParameterValue='4321'
   c. ParameterData[3]
      i. ParameterID=3
      ii. ParameterType=1
      iii. ParameterValue='15'
   d. ParameterData[4]
      i. ParameterID=4
      ii. ParameterType=1
      iii. ParameterValue='987654321'
   e. ParameterData[5]
      i. ParameterID=5
      ii. ParameterType=2
      iii. ParameterValue='Thanks'
   f. Request
      i. commandID=1
      ii. serverAddress='8885551212'
      iii. parameterData=5 element ParameterData array from above
4. The mobile application then calls the SendRequest( ) API using the above Request structure data. Control now passes to the client API.
5. The client API now performs the encode algorithm and converts the Request structure into the following text string:
1#1#1#123456789#2#1#4321#3#1#15#4#1#987654321#5#2#8#44#2#66#55#7777###
Applying the above rules to the encoded example above, the following is seen:
   A. The leading '1#' means 'CommandID 1' which is known to be a "payRequest" command
   B. The following '1#' means 'ParameterID 1' which is known to be a "sourceAccountNumber" parameter.
   C. The following '1#' means 'AMD parameter type 1' which is known to be "numeric".
   D. The following '123456789#' means that the sourceAccountNumber value is '123456789'.
   E. . . . and so on for the numeric parameter types
   F. The trailing '8#44#2#66#55#7777##' is the DTMF alpha encoding for the word "THANKS". The last '#' indicates a complete alpha data element sequence.
   G. The final '#' indicates the end of the complete request/response data.

Returning to the operations of the example application,
6. The API then dials the indicated server "phone number" (i.e. '8885551212') and initiates a voice call.
7. The server IVR component "picks up" and waits for the encoded DTMF request data.
8. The client API then transmits the entire above encoded DTMF request.
9. When the final # is received, the server IVR "plugin" component begins decoding the encoded DTMF request data. To do this, the IVR "plugin" uses the inverse of the encoding rules presented above.
10. The IVR "plugin" has now assembled an exact duplicate of the client's Request structure, only now on the server side memory space.
11. The IVR "plugin" now invokes the enterprise server application via the ProcessRequest( ) interface which the enterprise server application has implement.
12. The enterprise server application processes the request accordingly.
13. The enterprise server application then assembles an Response structure just as the mobile client application assembled the Request structure.
14. The enterprise server application returns the Response structure and control to the IVR plugin.
15. The IVR plugin then encodes the Response structure as described above (i.e., in this case with the status and transactionNumber data elements).
16. The IVR transmits the encoded DTMF response data to the mobile client application API.
17. The mobile client application API decodes the encoded DTMF response data into a client side Response structure using the decoding rules described above (i.e. in this case into an Response structure).

18. The API returns the Response structure and control to the host client mobile application.
19. The host client mobile application regains control, has access to the server Response structure and continues processing.

Hence the present invention provides for program applications to communicate over the voice channel of mobile consumer communications devices. As mentioned earlier, encoding different from DTMF might be selected to speed the transmission of data across the voice channel. Such encoding might depend upon the particular application on the host mobile consumer communications device and corresponding enterprise server.

U.S. patent application Ser. No. 11/694,747, filed Mar. 30, 2007, is incorporated by reference and discusses a mobile person-to-person payment system. Furthermore, for mobile consumer communications devices which use an IM (Identification Module) for the wireless communications network, U.S. patent Ser. No. 11/694,906, entitled, "Programmable Functionalities For Mobile Consumer Communications Devices With Identification-Modules," filed on even date by the present inventor and incorporated herein by reference for all purposes, describes a technology by which embodiments of the present invention might be incorporated into such devices. That is, such mobile consumer communications devices could be adapted to communicate program application data across the voice channel, rather than the data channel, of the wireless communications network.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of operating a mobile consumer communications device communicating over a wireless communications network, comprising the steps of:
   receiving program application data to be transmitted over a wireless communications network, the program application data structured by a protocol;
   encoding the program application data into tones for a voice channel of said wireless communications network, the program application data structured by a protocol adapted to be decoded by interactive voice response; and
   transmitting said tones over said voice channel.

2. The method of claim 1 wherein the program application data comprises a first group of transaction information provided by a user comprising at least a transaction amount and an additional group of transaction information based on context and the configuration of the mobile device, the encoding step comprises assembling a plurality of data structures representative of the transaction information into a text string, and the transmitting step comprises initiating a voice call and wirelessly transmitting the text string over said voice channel.

3. A method for managing transactions over a wireless communications network comprising the steps of
   gathering, via a client application running on a mobile device, a first group of transaction information provided by a user comprising at least transaction amount,
   determining, based on context and configuration of the mobile device, an additional group of transaction information,
   assembling a plurality of data structures representative of the transaction information,
   converting, in accordance with an encoding algorithm, the plurality of data structures into a text string,
   initiating a voice call, and
   wirelessly transmitting the text string to a remote server.

* * * * *